(No Model.)
T. A. EDISON.
PYROMAGNETIC GENERATOR.
No. 476,983. Patented June 14, 1892.
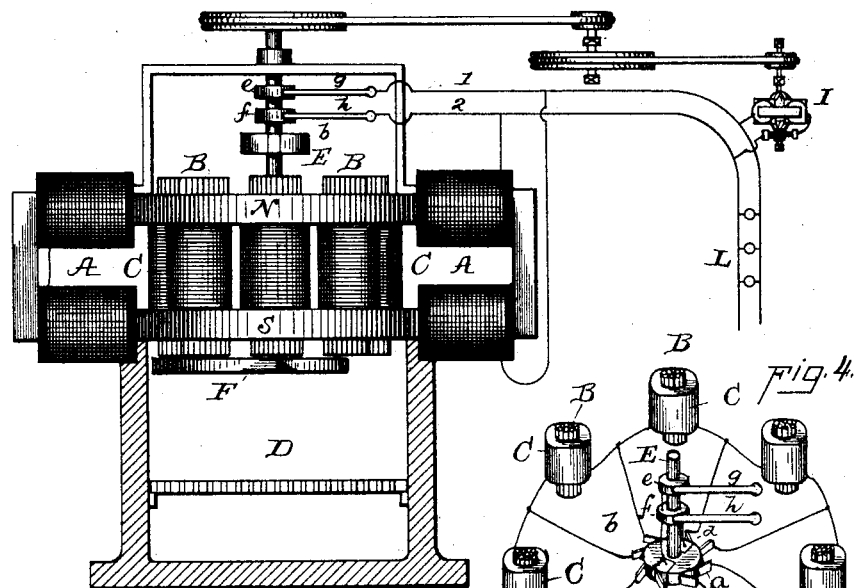
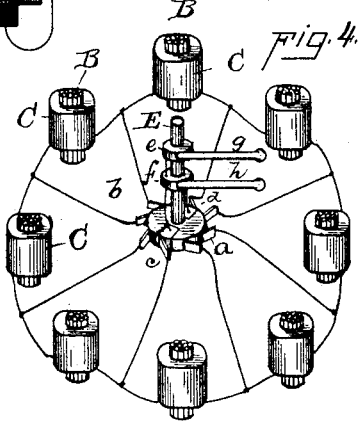
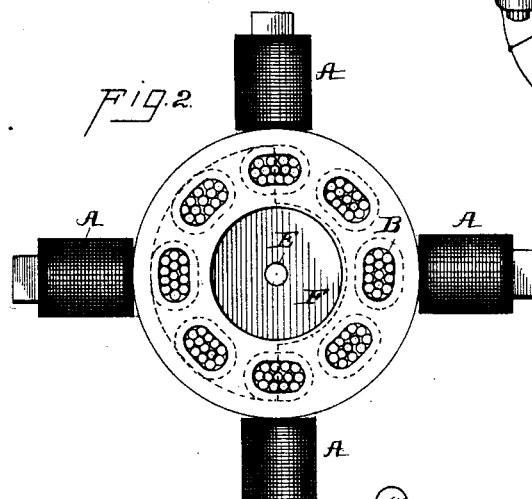
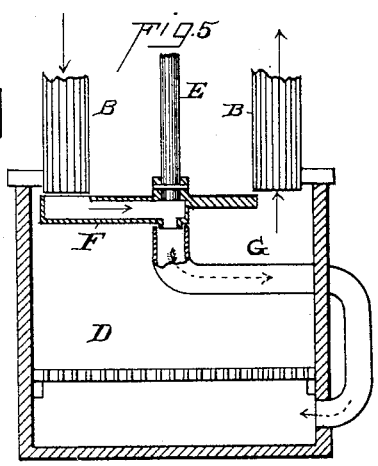
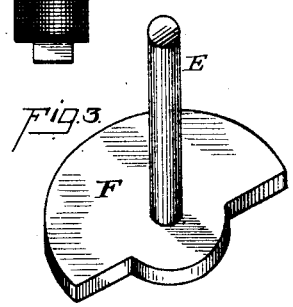
ATTEST:
E. L. Rowland
William Pelzer
INVENTOR:
Thomas A. Edison,
By Dyer & Seely
Attys.

UNITED STATES PATENT OFFICE.

THOMAS A. EDISON, OF LLEWELLYN PARK, NEW JERSEY.

PYROMAGNETIC GENERATOR.

SPECIFICATION forming part of Letters Patent No. 476,983, dated June 14, 1892.

Application filed June 13, 1887. Serial No. 241,099. (No model.)

*To all whom it may concern:*

Be it known that I, THOMAS A. EDISON, of Llewellyn Park, in the county of Essex and State of New Jersey, have invented a certain new and useful Electrical Generator, of which the following is a specification.

The object I have in view is the generation of powerful electric currents more economically than heretofore and more directly from the combustion of coal.

In carrying out my invention I utilize the principle that the capacity of iron for magnetism diminishes as its temperature is raised and that at a bright-red heat it becomes practically diamagnetic. By surrounding magnetized iron by electric conductors or bringing such conductors in any way into the magnetic field produced by such iron and alternately increasing and decreasing the heat of such iron (the magnetism of the iron being thereby alternately decreased and increased) electric currents will be induced in such conductors first in one direction and then in the other. The alternating currents may be utilized directly or commutated into a continuous current of one direction. Thus I am enabled to translate heat energy into electric energy by the action of heat on magnetized iron. An electric generator utilizing this principle I have termed a "pyromagnetic generator."

Many arrangements and constructions of apparatus can be produced for carrying into effect the principle of my invention and without departing from the spirit and scope thereof.

As an illustration of one form of apparatus embodying my invention, I may employ two rings of iron arranged a suitable distance apart, one above the other, in parallel horizontal planes and with their axes in line. These rings form the polar extensions of one or more powerful electro or permanent magnets, one ring being the north pole and the other the south pole. The rings are connected by a number of iron tubes, which pass completely through both rings, forming interstitial armatures connecting the poles of the magnets. The tubes are preferably small in size and are arranged in bundles. Each tube is as thin as possible, so that it can be heated and cooled rapidly, and the iron thereof is protected from oxidation by nickel-plating, enameling, or otherwise. The bundles of tubes form interstitial bodies constructed of thinly-disposed magnetic material and having a great heat radiating and absorbing surface relative to their mass, so that variations in temperature can be rapidly produced. Each bundle of tubes is surrounded by a winding of wire. Beneath the lower ring is a furnace, for which the iron tubes or part of them form the exit-flues. To direct the heat from the furnace through the bundles of tubes progressively, a shield covering the lower end of one-half of the tubes is mounted on a shaft passing through the open centers of the rings. The tubes that are covered by this shield are protected from the heat of the furnace, the products of combustion from which pass upwardly through the other tubes. All the tubes protected by the shield will be losing heat and giving magnetism, while the other tubes will be increasing in heat and decreasing in magnetism. The decrease of magnetism in one-half of the bundles of tubes will generate a current in the coils around them, while the increase of magnetism in the other bundles of tubes will generate a current of the opposite direction in their coils. These currents, by means of suitable commutators operated by the same shaft which turns the shield, can be taken off as continuous or alternating currents.

To conserve the heat and make the cooling of the tubes more rapid and the machine more efficient, the fresh air supplied to the furnace may be drawn through the tubes that are cooling. This can be done by making the revolving shield hollow and connecting it with a pipe leading to the furnace beneath the grate.

The shaft carrying the shield and commutator may be revolved by any suitable means. Its speed should be such as to give the maximum electro-motive force. It can be operated by an electric motor supplied with current from the generator itself, in which case it would be self-regulating, since any fall in electro-motive force would slow down the motor and any rise in electro-motive force would increase the speed of the motor, a decrease in speed acting to increase electro-motive force by permitting a greater variation between the maximum and minimum heat of the tubes, and an increase in speed having the opposite effect.

Permanent magnets may be employed to magnetize the tubes; but I prefer to employ electro-magnets. These electro-magnets may be energized from a separate source of electrical energy or from the generator itself. In the latter case the field-magnets may be in small part of steel, so as to form a permanent magnetism to build up from in starting, or a battery may be employed for that purpose, providing the residual magnetism should prove insufficient. The wire wound about the bundles of tubes and also that on the field-magnets should be insulated in such a manner as to be capable of withstanding a high temperature without change.

In the accompanying drawings, forming a part hereof, Figure 1 is an elevation and partial section of an apparatus embodying my invention; Fig. 2, a top view of the machine with the parts above the upper ring removed; Fig. 3, a separate perspective view of the revolving shield; Fig. 4, a perspective view of the bundles of tubes forming the interstitial armature and the surrounding bobbins showing the commutator connections; and Fig. 5, a vertical section through the furnace, showing the revolving shield arranged as a fresh-air box.

N S are two iron rings connected with the north and south poles, respectively, of permanent or electro magnets A.

B represents bundles of iron tubes passing through the rings N S and packed tightly in openings therein by asbestus or other infusible material. The tubes of these bundles may be each small and thin. They may be composed of iron only six one-thousandths of an inch in thickness or less drawn through a die into tubes with abutting edges, the diameter of each tube being as small as one-eighth of an inch, or tubes of larger size and composed of thicker iron may be employed. The tubes form an interstitial armature which can be readily heated and cooled, or heated in part and cooled in part at the same time. It is evident that an interstitial armature can be constructed by rolling up a sheet of corrugated iron or in many other ways. These tubes may be nickel-plated or covered thinly with enamel or otherwise protected to prevent oxidation. The bundles of tubes project beyond the rings N S, and between such rings each bundle of tubes is surrounded by a bobbin C of insulated conducting wire. The ring S is mounted over a furnace D, the products of combustion from which pass up through the tubes of the bundles B.

In the center of the rings N S is a vertical shaft E, which carries on its lower end a shield F, preferably of fire-clay. This shield projects laterally from the shaft beneath the lower ends of the bundles of tubes. Its size and shape are such that it closes the open center of the ring S, and at the same time covers and protects from the furnace one-half of the tubes. The tubes not protected by this shield receive the products of combustion and are heated, while the tubes so protected are cooled. To increase the rapidity of cooling and conserve the heat, the shield F may be an air-box, as shown in Fig. 5, and be connected by a pipe G, leading to the ash-box of the furnace, so that the air-supply for supporting combustion will be drawn through the tubes covered by the shield.

The several bobbins C are connected together, Fig. 4, like a Gramme ring, and wires run from these connections to brushes or springs $a$, which rest on a disk $b$ of insulating material. This disk carries two blocks $c\ d$ of metal, with which the brushes $a$ make contact in succession, two opposite brushes being always in contact with these metal blocks. The metal blocks $c\ d$ are connected with separate insulated rings $e\ f$ on the shaft, on which bear brushes or springs $g\ h$, connected with the circuit 1 2, to which the machine supplies current. One half the bobbins generate a current in one direction, while the other half generate a current in the opposite direction, and these currents meet at the commutator, as in a Gramme machine, and pass into the external circuit. The magnets A, when electro-magnets, may be supplied with current from the circuit 1 2 or from an independent source, as before explained. The shaft E may be revolved by an electric motor I through a speed-reducing gearing, and this motor may be operated from the circuit 1 2, in which case the pyromagnetic generator will be self-regulating.

L represents electric lamps, motors, or other translating devices supplied with current through the circuit 1 2 by the electro-thermic battery.

The form of apparatus shown in the drawings is given as a simple illustration of an embodiment of the invention.

It is evident that the invention can be embodied in different or more complex forms and that many modifications can be made in the construction and arrangement of the parts without departing from the spirit of my invention.

What I claim is—

1. An electrical generator having, in combination, an interstitial body constructed of thinly-disposed magnetic material, whereby it is given a great heat radiating and absorbing surface relative to its mass, a source of magnetism for magnetizing such body, a controlled source of heat for heating such body, whereby its temperature can be raised and lowered, and an electric conductor located within the influence of the varying field of force caused by the heating and cooling of such body when magnetized, substantially as set forth.

2. An electrical generator having, in combination, a magnetized body, an electric conductor located within the influence of its field of force, a controlled source of heat for heating such body, whereby its temperature can be raised and lowered, and a commutator for commutating the alternating current generated in said electric conductor into a straight current, substantially as set forth.

3. An electrical generator having, in combination, an interstitial body constructed of thinly-disposed magnetic material, whereby it is given a great heat radiating and absorbing surface relative to its mass, a source of magnetism for magnetizing such body, a controlled source of heat for heating such body, whereby its temperature can be raised and lowered, an electric conductor located within the influence of the varying field of force caused by the heating and cooling of such body when magnetized, and a commutator for commutating the alternating current generated in said electric conductor into a straight current, substantially as set forth.

4. An electrical generator having, in combination, a magnetized body, an electric conductor located within the influence of its field of force, a source of heat for heating such body, and a moving director or shield alternately directing the heat to and cutting it off from such magnetized body, substantially as set forth.

5. An electrical generator having, in combination, a magnetized body, an electric conductor located within the influence of its field of force, a source of heat for heating such body, a moving director or shield alternately directing the heat to and cutting it off from such magnetized body, and a cold-air channel controlled by said director or shield and connected thereby with said magnetized body when the heat is cut off therefrom, substantially as set forth.

6. An electrical generator having, in combination, a series of magnetized bodies, electric conductors located within the influence of the fields of force of such bodies, a source of heat, and a heat director or shield directing the heat to and cutting it off from such magnetized bodies in succession, whereby the temperature of such bodies is progressively raised and lowered, substantially as set forth.

7. An electrical generator having, in combination, a series of magnetized bodies, electric conductors located within the influence of the fields of force of such bodies, a source of heat, a heat director or shield directing the heat to and cutting it off from such magnetized bodies in succession, whereby the temperature of such bodies is progressively raised and lowered, and a commutator collecting the currents from said several electric conductors and delivering them as a straight current to the translation-circuit, substantially as set forth.

8. An electrical generator having, in combination, a series of magnetized bodies, electric conductors located within the influence of the fields of force of such bodies, a source of heat, a heat director or shield directing the heat to and cutting it off from such magnetized bodies in succession, whereby the temperature of such bodies is progressively raised and lowered, and a cold-air channel controlled by said director or shield and connected thereby with the magnetized bodies as they are cut off from the source of heat, substantially as set forth.

9. An electrical generator having, in combination, a series of magnetized interstitial bodies constructed of thinly-disposed magnetic material, so as to have a great heat radiating and absorbing surface relative to their mass, electric conductors located within the influence of the fields of force of such bodies, a source of heat, and a heat director or shield directing the heat to and cutting it off from such magnetized bodies in succession, whereby the temperature of such bodies is progressively raised and lowered, substantially as set forth.

10. In an electrical generator, the combination, with a magnet, of an interstitial body of magnetic material placed in metallic connection with both poles of the magnet and forming a keeper thereto, an electric conductor wound around or upon such interstitial body, and a controlled source of heat, whereby the temperature of such interstitial body can be raised and lowered, substantially as set forth.

11. An electrical generator wherein are combined two iron rings or plates connected by a number of interstitial bodies of magnetic material, one or more magnets magnetizing such rings or plates and interstitial bodies, conductors wound around such interstitial bodies, a furnace, and means for directing the heat from such furnace through such bundles of tubes progressively, substantially as set forth.

12. An electrical generator wherein are combined two iron rings or plates connected by a number of interstitial bodies of magnetic material, one or more magnets magnetizing such rings or plates and interstitial bodies, conductors wound around such interstitial bodies, a furnace, and means for directing the heat from such furnace through such interstitial bodies progressively and for drawing fresh air to supply said furnace through the interstices of the other bodies, substantially as set forth.

13. An electrical generator wherein are combined two iron rings or plates connected by a number of interstitial bodies of magnetic material, one or more magnets magnetizing such rings or plates and interstitial bodies, conductors wound around such interstitial bodies, a furnace, and a moving shield covering the open ends of such interstitial bodies in succession and cutting them off from the heat of the furnace, substantially as set forth.

14. An electrical generator wherein are combined two iron rings or plates connected by a number of interstitial bodies of magnetic material, one or more magnets magnetizing such rings or plates and interstitial bodies, conductors wound around such interstitial bodies, a furnace, a moving shield covering the open ends of such interstitial bodies in succession, and a fresh-air duct connected with said shield for drawing fresh air through the tubes covered by the shield, substantially as set forth.

15. The combination, with the moving heat-directing shield of a pyromagnetic generator, of a motor moving such shield operated or controlled by the current from such generator, whereby the generator is made self-regulating, substantially as set forth.

16. An electrical generator wherein are combined a series of magnetized bodies, electric conductors within the influence of the fields of force of such bodies, a source of heat, a moving director or shield for directing the heat to such bodies progressively, a moving commutator for collecting the currents induced in said conductors, and an electric motor supplied with current by said commutator and operating both said commutator and said directing means, substantially as set forth.

17. An electrical generator wherein are combined two iron rings or plates connected by a number of interstitial bodies of magnetic material, one or more magnets magnetizing such rings or plates and interstitial bodies, conductors wound around such interstitial bodies, a furnace, a moving shield covering the open ends of said interstitial bodies in succession and cutting them off from the heat of the furnace, and an electric motor operating said shield and supplied with current from such conductors, substantially as set forth.

This specification signed and witnessed this 24th day of May, 1887.

THOS. A. EDISON.

Witnesses:
WILLIAM PELZER,
E. C. ROWLAND.